United States Patent Office 3,025,067
Patented Mar. 13, 1962

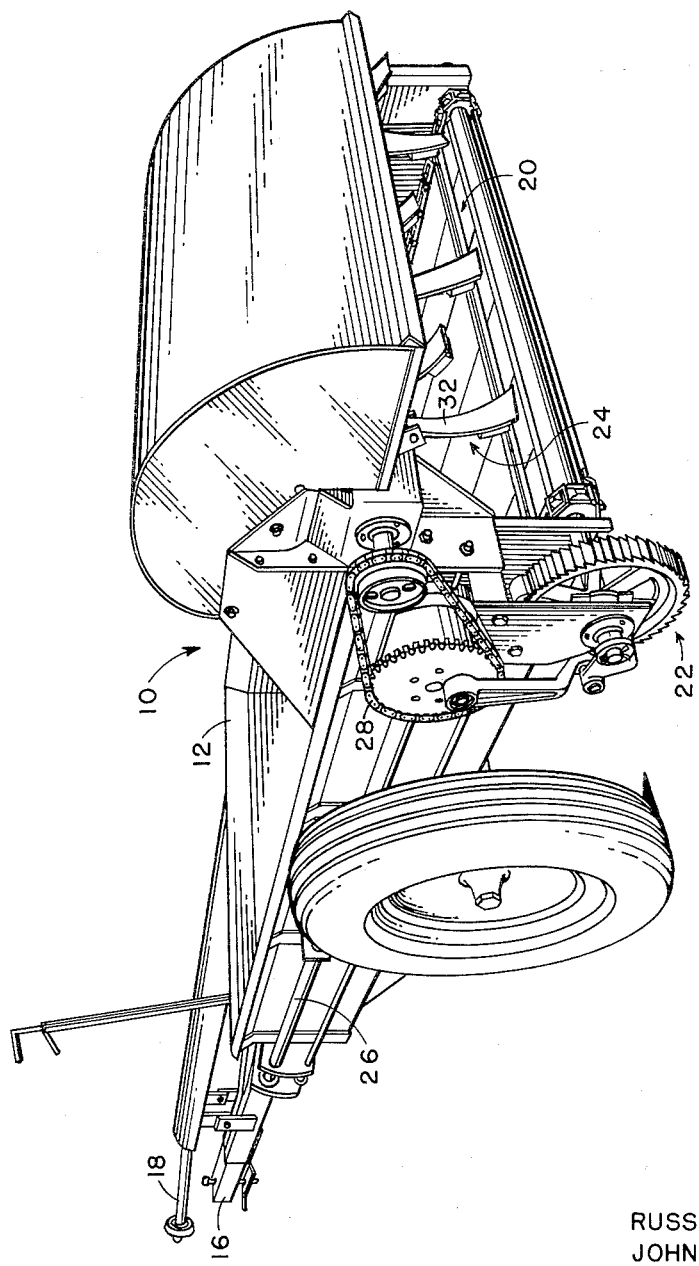

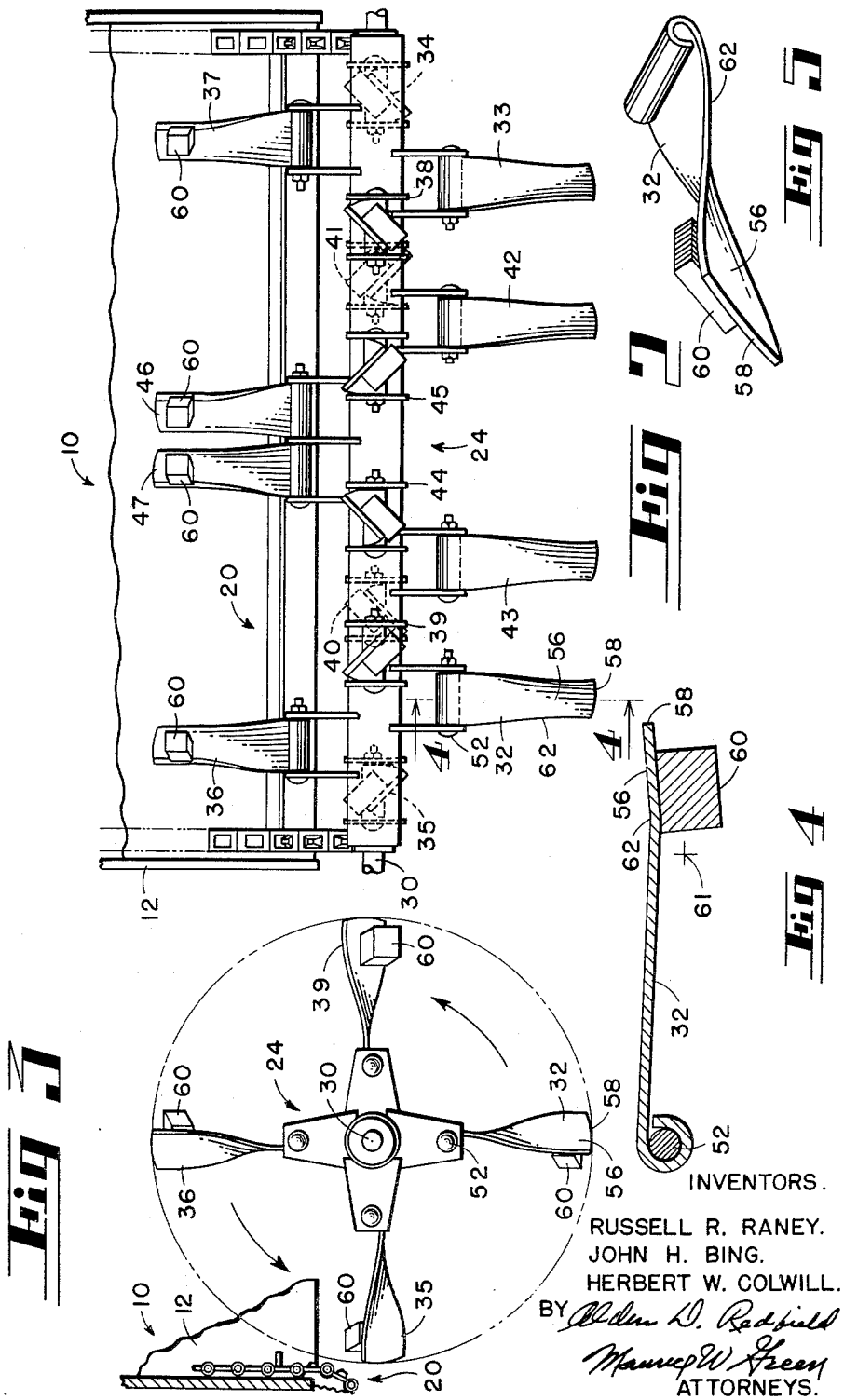

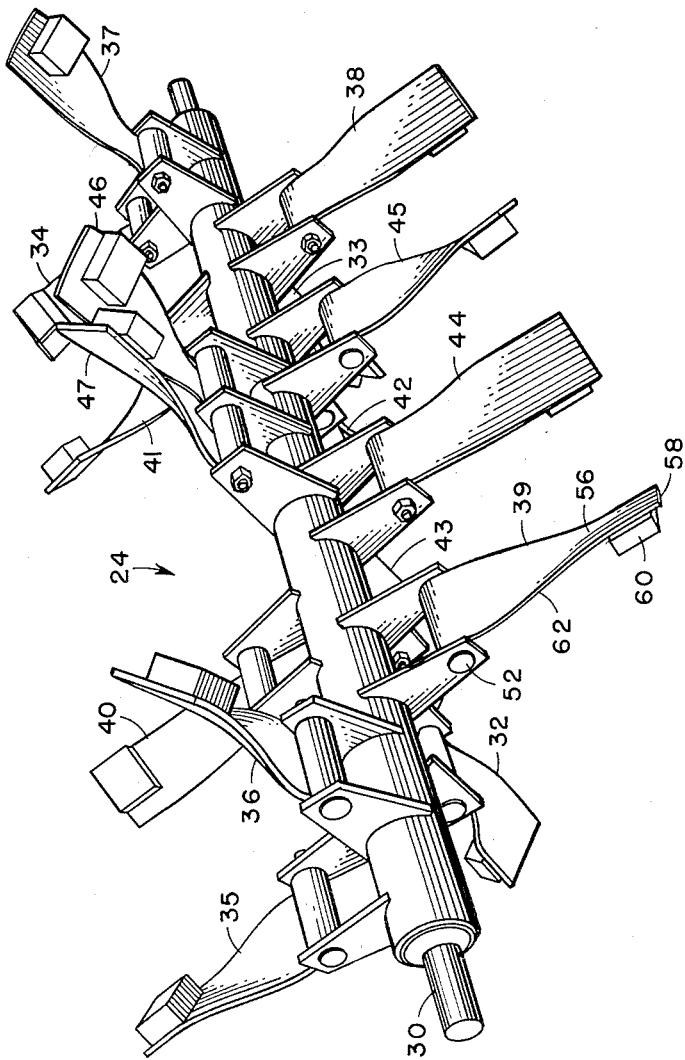

3,025,067
FLAIL BEATER UNIT FOR A SPREADER AND SCATTERING DEVICE
Russell R. Raney and John H. Bing, Greenville, and Herbert W. Colwill, Celina, Ohio, assignors to Avco Corporation, Coldwater, Ohio, a corporation of Delaware
Filed Sept. 7, 1960, Ser. No. 54,485
4 Claims. (Cl. 275—6)

This invention relates to a flail beater unit for a spreading and scattering device.

More particularly, the improvement relates to a rotating flail beater assembly employing a plurality of one-pivot swinging flails which will satisfactorily, with one rotating beater assembly, sever and distribute from a load and at the same time afford a widespread distribution substantially twice box width by such unitary device, while satisfactorily shredding and disintegrating the material to be spread. The flail beater assembly is also particularly adaptable to cold weather operation, where conventional beaters are known to give major operating difficulty by clogging and collection of frozen material.

In the most commonly used prior art spreading and distributing mechanisms, primarily designed for manure spreaders, it has been common practice to provide a two-unit arrangement for completing the shredding and distributing function, and specifically a beater at the end of the conveyor of the spreader box which severs material from the load and throws such material onto a second distributing beater farther to the rear, which beater has deflecting members inclined to the plane of rotation for completing a widespread of the material to substantially twice the width of the spreader box. Prior adaptations of flail beaters to spreaders have been deficient in completing widespread of the material equal to that of the two-unit arrangement above mentioned.

Manure spreader beaters with chain flails operating at the end of a moving apron to distribute material are old in the art, and flails per se, of the type where a plurality of swinging, rigid, generally bar-shaped units with one pivot at the base and with a knife edge at the end, is a type of flail which has been quite commonly known and used in the forage harvester art. Furthermore, in the art of scattering generally, there is disclosure of chain flail beaters, as well as one-pivot swinging flail beaters.

The improvement of the present invention affords a mechanism employing a rotating cylindrical beater with one-pivot flail members satisfactory for shredding, distributing and widespread functions, and more specifically the improvements relate to a form and arrangement of the swinging flail members which, acting together and in cooperation with the apron, results in improved performance as to shredding, distributing and widespread functions.

The present invention employs a plurality of single pivot flail members in a beater assembly with surfaces inclined to the plane of rotation in opposite directions on opposite sides of the center line of the flail type beater to assist in accomplishing this widespread of material.

An additional important feature is a weight distribution of the flail such that the center of gravity of each flail is behind the contacting surface of the flail so that when the flails are carried in rotation the center of gravity normally is positioned on the radial line from the pivot point, thus causing the contacting surface of the flail to be inclined toward the direction of rotation causing the flail to thus have the effect of retaining material as though it were bent longitudinally. Such structure has the effect of causing material carried by the flail to be retained on the surface of the flail for a greater circumferential arc in the rotation and thus to be released at a higher position and affords a scattering for a greater distance, and when combined with the twisted shape of the flail will cause a greater widespread of the material than would otherwise be the case. It has been found in practice that the flail may also be actually bent a small amount in longitudinal length but that the weight distribution makes this necessity for bending a minor amount.

A further feature is the provision of knife edge end portions of each flail, also inclined to the plane of rotation but without serrations to assure release of the material also under the action of the inclined or twisted surfaces, which, together with the weight distribution and form of the flail members, contribute to satisfactory results.

It is therefore a primary object of the present invention to provide a flail type beater arrangement for a spreader which will afford the advantages of the flail type beater and in the same beater unit, without the use of an additional beater with deflector blades, will complete a widespread of the material substantially equal insofar as width of spread is concerned to a conventional two-unit arrangement.

It is a further object of this invention to provide a rotating beater unit of the one-pivot flail type, wherein the flails are of such form as to both satisfactorily sever and shred material to be scattered and to spread such material to approximately twice the spreader box width, such results to be satisfactorily accomplished with one beater assembly in freezing weather and with frozen material.

It is a further object to provide in a beater assembly of flail members a weight distribution of each flail such that the center of gravity of the flail is rearward of the face of the flail which moves toward the direction of rotation, thus causing the flail to assume an inclined position toward the direction of rotation.

It is a further object to provide in a beater assembly of flail members with surfaces inclined to the plane of rotation the combination with form and weight distribution of flail members to afford a scoop action by surfaces of the flail members, thereby to improve the widespread effect of a flail type beater assembly.

It is a further object to provide a flail beater unit with a knifelike cutting edge at the end of each flail member, the cutting edge being inclined to the plane of rotation of the flail with the cutting edge free of serrations so that material severed by the combined beating and cutting action of the flails is free to be carried and distributed to the rear and to both sides by the relatively wide, inclined and curved body portions of the flail members as the material is carried in rotation after being severed from the load.

The above and other objects of the invention will appear more fully from the following more detailed description and by reference to the accompanying drawings, forming a part hereof and wherein:

FIG. 1 is a perspective view of a manure spreader with the improved flail beater unit attached thereto.

FIG. 2 is a top view of the flail beater unit positioned at the end of the box.

FIG. 3 is an end view of the flail beater unit shown in FIG. 2, showing the position of the flails during rotation and also the position thereof relative to the adjacent conveyor located in the box.

FIG. 4 is a sectional side view of one of the flail members showing the weight distribution on line 4—4 of FIG. 2.

FIG. 5 is a perspective view of one of the flail members.

FIG. 6 is a perspective view of the flail beater unit with flails extended as they are positioned during rotation.

Referring to the drawings, and particularly to FIG. 1, reference numeral 10 refers to the manure spreader unit of this invention which comprises a load carrying box 12, here shown as a two-wheeled vehicle appearing in FIG. 1, together with the draft connection 16 and power takeoff connection 18, intended to make it possible to connect this vehicle to a tractor with power from the tractor to rotate the mechanism of the unit. The box includes a conventional conveyor assembly 20, actuated by suitable gearing 22, to cause conveyor 20 to move a load carried in the box 12 rearwardly toward the end of the box for distribution and scattering by the rotating flail beater unit 24, the specific structure of this flail beater unit 24 being a principal feature of this invention. The flair beater unit 24, as well as the conveyor, are driven from the power source 18 through the shaft 26 which actuates the conveyor drive gearing 22 and also rotates the beater or flail unit 24 through the chain drive 28. The center shaft 30 of the beater 24 is supported transversely at the rear of the box 12 and above and to the rear of the end of conveyor apron 20, and carries a plurality of individual swinging flail members, here shown as sixteen in number and here designated by the numerals 32 to 47 inclusive. These flails are distributed symmetrically around the shaft 30, the first numbered flail 32 being used for illustration and, as shown in FIGS. 2, 3, 4 and 5, each of these flails 32, et seq., are pivoted at their inner ends on a single pivot 52 on which the swinging flail unit is free to swing. On rotation of the shaft 30 in a counterclockwise direction, as shown in FIG. 3, each of the flails are caused to swing outwardly in a radial direction by centrifugal force (see FIG. 6) and their tip ends rotate closely adjacent to the conveyor 20, as shown in FIG. 3. The direction of rotation of the shaft 30 thus causes the flail members 32 et seq. to move downwarddly onto the load as it moves into the rotating flail beater unit 24. On rotation, each of the flails by their weight act on the load as it is moved by conveyor 20 against the rotating flails of the beater unit. The flails will thus sever material from the load and carry it downwardly and arcuately of the beater 24, as shown in FIG. 3, to be distributed from the rear of the unit 10 in a so-called undershot discharge from the flail beater unit.

The form of the individual flails and their relationship to each other is an important part of this invention, and important features thereof are: the twisted surface 56, inclined relative to the plane of rotation, which is the surface facing the direction of rotation and contacting the load on rotation; the knifelike end 58 which, as an outer edge of the twisted surface 56, is also at an angle to the load on contact therewith; the weighted end portion 60 which weight is so distributed to assure a center of gravity rearward of surface 56 and sufficient mass to provide positive beating action; the longitudinally curved shape 62 of the surface 56 of the flail, which serves as a scoop to carry the material to greater height before distribution and in combination with the twisted surface 56 and weight distribution thus assures greater widespread, as discussed in more detail below.

Referring to FIG. 4, there is shown a cross section through one of the flail units and it there appears that the weighted end portion 60, together with the longitudinal portion 62, affords a center of gravity as marked at 61 in FIG. 4, so that a radial line from the center of the pivot 52 through the center of gravity 61 indicates an approximate radial position of the flail as it is carried in rotation, and thus it appears that because of this weight distribution the twisted surface 56 of the flail is moved relatively in a counter-clockwise direction so that the surface 56 is, in effect, inclined longitudinally in its rotation, and it is apparent that such positioning will cause material to be carried on the surface 56 in a scooplike action to a greater circumference of rotation before release than would be the case if the center of gravity of the flail were located near the surface 56 instead of displaced substantially rearward as is shown in FIG. 4. This structure therefore produces a scooplike action and retards the release of material during rotation, thus causing greater widespread because release from the beater is higher.

The flail beater unit 24, as previously mentioned, is made up of shaft 30 extending transversely of the box 12 at the rear end thereof and positioned upwardly and rearwarddly of the end of the conveyor apron 20. The plurality of single-pivot flails 32–47 inclusive, are each pivoted at 52 at their base adjacent the shaft 30, and they are carried by the rotation of the shaft 30 in swinging relationship thereto so that the extending body portions of each of the flails, the surfaces 56 of which are substantially of rectangular bar shape, and are so formed as to provide a twisted surface on each of the flails longitudinally of each flail. On rotation of the shaft the flails 32 are swung downwardly on the load of material so that they sever and eject material from the underside of the rotating flail beater 24 in the previously-mentioned undershot discharge and scattering action. The flail beater unit thus acts on the load carried in the box 12 as it moves rearwardly by the action of the conveyor 20. It is noted in reference to FIGS. 2 and 3 that the several flails are arranged so that on rotation the centrifugal force during rotation causes the flails to extend radially outwardly, as shown also in the perspective view of FIG. 6. The several flails are so arranged on the shaft 30 so that the flails to one side of the center line of the box, as shown in FIG. 2, are twisted with the faces 56 at such an angle that material is thrown longitudinally lengthwise of the shaft to spread such material in a direction wider than the box. The flails on opposite sides of the center of the box are twisted in the opposite direction to throw material longitudinally of the shaft in opposite directions, thereby to spread material wider than the box. In order to assure distribution at the center rear of the spreader, one pair of flails 46 and 47 near the center have an opposite twist, as shown. It was found, on test of this type of unit employing flails built to provide widespread by this twisted arrangement, that if individual flails are bent along their longitudinal length so that each flail is given a so-called scoop shape 62 in the direction of rotation, it will, by such curved longitudinal shape 62, retain material for a longer time in the undershot discharge on rotation and will therefore release material at a higher position at the rear in the rotation of the flail. Therefore, because of such retention caused by the curved scooplike shape, the material, when released, will therefore be thrown a greater distance in the longitudinal direction, and the net result will be a wider spread of material to each side of the box 12. The weight distribution of each flail, as previously described, also causes the flail to assume an inclined position toward direction of rotation, which also affords a scoop action to retain material for a higher release position. That is, the widespread of the material scattered from the end of the box will be greater and with the mechanism, as shown in the drawings, it is possible to scatter a swath of material on the ground, having a width substantially twice the width of a 50" box, or a width of approximately 100", which is a satisfactory result. The scattering and widespread of the material is thus accomplished with a single beater to the desired width, a result which has previously been accomplished on many prior art devices by two-unit beater and distributing members.

The knife blade end 58 of the flail members 32 are inclined relative to the plane of rotation of the individual flail units 32, as is determined by the twisted surface 56, which terminates in the knifelike edge 58. The knifelike edges are not serrated, in so-called rooster comb form, but are relatively sharp and have continuous cutting surfaces so that material which is severed by the contact of the flail members with the load by the combined action of beating and cutting is carried in greater arc by the aforementioned curve 62 for distribution, and at the desired angle is not deterred from being scattered by any serrations of the knife edge 58, but will be released at a height in rotation as determined by the scooplike positioning and shape of the flail members is previously described.

It is believed that the operation of the device will be understood from the foregoing description. As stated, the load of material to be distributed, carried in the box 12, is moved rearwardly toward the rotating flail beater unit 24 by the conveyor 20. The flail beater unit 24 with its plurality of swinging flail members 32 et seq. rotating in a direction so that the flail members 32 move downwardly as to contact the load, the knifelike edges 58 contacting and shearing the material by a slantwise end contact due to the angle of the knifelike end of each flail unit, the weight 60 on the end of the flail affording sufficient mass to cause positive action against the load and to sever and cut the material, in a shredding action, from the load as it is moved against the rotating beater 24 by the conveyor 20. The inclined and scoop-shaped surfaces of the flail members affording an improved scattering and spreading action as has been described.

Although the invention has been disclosed by reference to an illustrative structure found to be practical in actual operation, it is nevertheless intended that various modifications may be made therein without departing from the fundamental principles and within the scope of the following claims:

1. A flail beater unit for operation with a spreader and scattering device having a material containing box and conveyor means for moving material rearwardly of said box for contact with said flail beater unit, comprising: a shaft transversely positioned for rotation at the end of said box and upwardly and rearwardly of the end of said conveyor, a plurality of flail members, a pivot connection between each of said flail members and said shaft positioning said flail members for free swinging movement in planes transversely relative to said shaft on rotation of said shaft, a body portion of each of said flail members extending outwardly from its pivot connection, a longitudinal surface of each flail member facing the direction of rotation of each of said flail members inclined relative to the plane of rotation of said flail member to deflect material longitudinally of said shaft, a weighted portion of each of said flail members with center of gravity displaced rearwardly relative to the direction of rotation of said flail and said longitudinal surface, whereby on rotation of said shaft and said flail members each of said flail members is thereby carried with its longitudinal surface inclined toward the direction of rotation of said flail member to cause said flail member to act as a scoop for retaining material carried by the longitudinal surface of each of said flail members for scattering from said flail beater unit.

2. A flail beater unit as set forth in claim 1 in which the longitudinal surface of each flail member is bent toward the direction of rotation of each said flail member to further assist in the formation of a surface acting as a scoop for retaining material carried by said flail members for scattering from said flail beater unit.

3. A flail beater unit for operation with a spreading and scattering device employing a box for carrying material to be spread and a conveyor for moving said material to the rear of said box against said rotating flail beater unit comprising: a shaft positioned transversely of said box and upwardly and rearwardly of the end of said conveyor, a plurality of flail members pivoted on said shaft and carried in rotation therewith symmetrically distributed around and longitudinally of said shaft to be carried in rotation with said shaft and to rotate therewith in free swinging movement relative to said shaft with the outer ends of said flail members in proximity to the end of said conveyor, a weighted portion of each of said flail members positioned near the end of each of said flail members and offset rearwardly of the forward surface of said flail to cause said flail members during rotation to be carried in position inclined toward the direction of rotation of said flail members.

4. A flail beater unit for a spreading and scattering device comprising: a plurality of swingably mounted flail members carried in rotation in a substantially cylindrical rotating unit, each of said flail members having a forward surface for lifting and carrying material for scattering by said flail beater unit, each of said flail members having a weight distribution with the center of gravity thereof substantially displaced rearwardly of said surface whereby each of said flail members during rotation is normally inclined toward the direction of rotation of each of said flail members thereby to lift material with scoop-like action during rotation.

References Cited in the file of this patent
UNITED STATES PATENTS

| | | |
|---|---|---|
| 1,035,724 | Nelson | Aug. 13, 1912 |
| 2,708,582 | Adams | May 17, 1955 |
| 2,740,247 | Worrell | Apr. 3, 1956 |
| 2,759,318 | Oppel | Aug. 21, 1956 |
| 2,815,781 | Myrold | Dec. 10, 1957 |
| 2,841,946 | Skromme | July 8, 1958 |